Dec. 3, 1968 T. B. SORBIE 3,414,127
METHOD AND APPARATUS FOR INSPECTING GLASS CONTAINERS
Filed Feb. 23, 1967 2 Sheets-Sheet 1
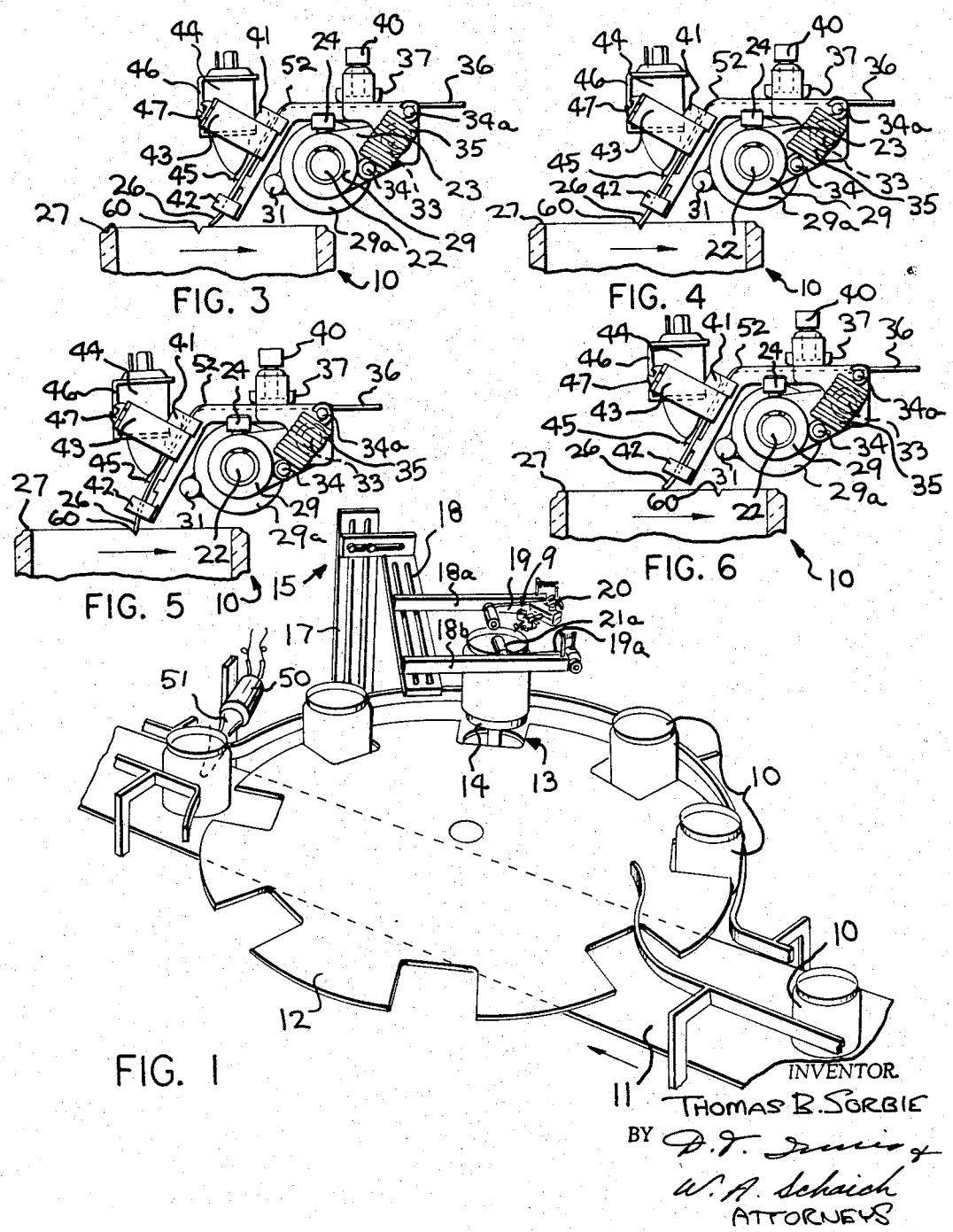

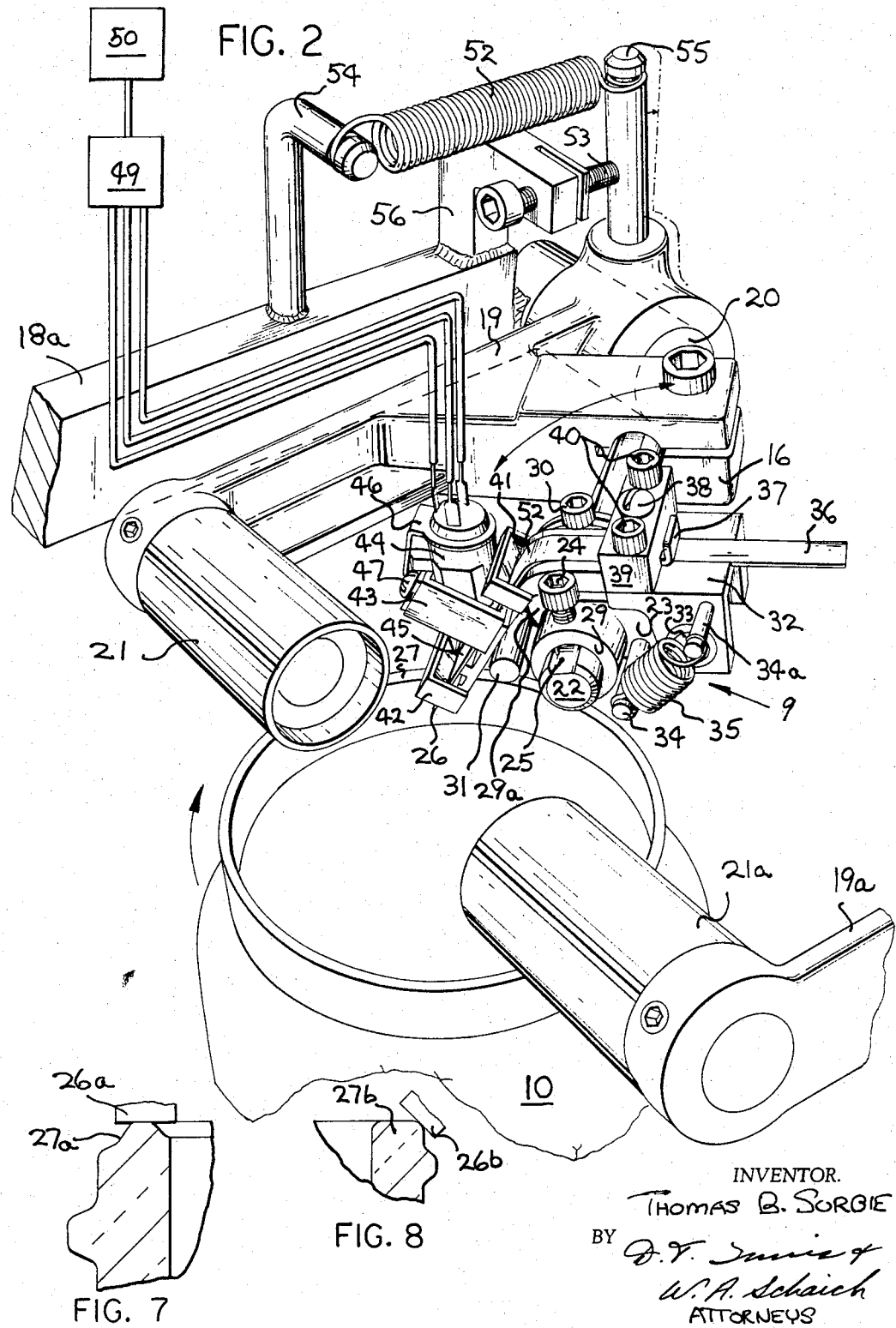

United States Patent Office 3,414,127
Patented Dec. 3, 1968

3,414,127
METHOD AND APPARATUS FOR INSPECTING
GLASS CONTAINERS
Thomas B. Sorbie, Toledo, Ohio, assignor to Owens-Illinois, Inc., a corporation of Ohio
Filed Feb. 23, 1967, Ser. No. 618,222
10 Claims. (Cl. 209—88)

ABSTRACT OF THE DISCLOSURE

An apparatus and method for detecting rim surface defects in glass containers wherein the edge of a thin strip of flexible, resilient, mechanically durable tape is contacted with the sealing rim surface of the glass container while the rim surface is being rotated. The tape is supported in such a manner that it will buckle or flex when contacting a defect and this buckling will provide as amplified mechanical displacement which is converted to an electrical signal to operate a reject mechanism.

Cross-references to related applications

The specific type of defect which the present invention is adapted to detect is known in the art as a line-over-finish defect and is disclosed and discussed in application Ser. No. 174,932 to Benny B. Mathias, filed Feb. 23, 1962, now Patent No. 3,355,980, assigned to the assignee of the present aplication.

In commonly assigned, copending U.S. application Ser. No. 428,369, filed Jan. 27, 1965 is disclosed a method and apparatus for detecting such line-over-finish surface defects wherein a film strip is used as the sensing or feeler element. While this device is quite effective there are disadvantages associated with prolonged continuous use in that the film often fractures or cracks upon contact with a surface defect. Accordingly, it is necessary to provide a fresh film surface at the point of contact each time a surface defect is encountered to assure efficient defect detection. This system is then limited by the mechanical capabilities of the film indexing mechanism.

Background of the invention

Most "line-over-finish" defects are produced by the entrapment within the molten glass of an air bubble which is elongated during the movement of the glass into the neck rings either by a settle-blow or by a plunger pressing operation. The blisters which are elongated by movement of the glass in the forming of the containers frequently open out through the surface of the container neck. These elongated blisters frequently occur over the top or sealing surface of the container neck or finish, thus producing the surface defect which is termed "line-over-finish."

It has been the practice in the past to examine containers for line-over-finish defects by directing a beam of light onto the surface to be inspected and relying on the reflective nature of the defect as a means for providing a signal in response to the presence of a defect. These prior devices unfortunately are only effective in those situations where the defect is oriented in such a manner that the light will be reflected from the defect to a prepositioned photo-sensitive pick-up.

It has been applicant's experience that line-over-finish defects which are produced during the parison forming portion of the glass container manufacturing process are not always oriented in such a manner as to be picked up by a single light source and photocell.

It has also been proposed that these surface defects be detected through the use of a vibration sensitive pick-up such as a phonograph pick-up wherein the needle is held against the surface to be tested, with the output of the pick-up being fed to a recorder or indicating instrument. It has been applicant's experience in adapting such a system to the detection of line-over-finish defects in containers that the needles have relatively poor wearing quality with respect to the type of surface being checked. Additionally, it has been found that these needles often sense non-detrimental surface defects such as those found on slightly rough finishes. This causes the rejection of commercially acceptable glassware. Furthermore, since these defects are of varied orientation and configurations, frequently the needles used as the defect sensitive member are chipped or broken. This presents a costly maintenance problem, particularly with respect to the operation of an inspection system which is intended to have an extended inplant operation without substantial maintenance. It should be obvious that it is highly desirable to eliminate those containers which possess line-over-finish defects because of the strong likelihood that an imperfect seal will result when these are filled and capped.

Summary of the invention

A novel method and apparatus for detecting rim surface defects in glass containers, wherein a thin strip of resilient, mechanically durable tape traverses the surface at an angle with respect thereto whereby the tape is caused to buckle when contacting a defect, and this buckling is converted to an electrical signal which operates a reject mechanism. One of the advantages of this system is that the tape is insensitive to slight surface imperfections, but will detect serious defects such as the line-over-finish defect.

Brief description of the drawing

FIG. 1 is a schematic perspective view of the glassware inspecting apparatus of the invention;

FIG. 2 is a perspective view of the sensing head of FIG. 1 on an enlarged scale;

FIGS. 3 through 6 are schematic side elevational views of the sensing head illustrating the sequence of operation of the sensing head as it encounters a defect;

FIG. 7 is a fragmentary, cross-sectional view of the rim surface of one container with the sensing element in contact therewith.

FIG. 8 is a view similar to FIG. 7 illustrating the angular relationship of the sensing element with a second container rim surface.

Description of the preferred embodiments

With particular reference to FIGURE 1 there is shown the general arrangement of a system for handling glass containers 10 through an inspection cycle. The handling equipment basically involves a conveyor 11 which is continuously moving from right to left as viewed in FIGURE 1. The containers are placed on the conveyor 11 which moves the containers into receiving position with respect to a counter-clockwise driven star wheel 12 adapted to slide the containers in succession at spaced intervals throughout a series of inspection stations, only one of which is disclosed herein. It should be pointed out that the star wheel is not continuously rotated but rather is indexed so as to present the containers to inspection station 13 in succession. As the containers arrive at the inspection station 13, they will be received on a spinner pad 14 which serves to elevate the container and at the same time rotate the container in a clockwise direction.

Adjacent to station 13 is located a stationary inspection head support generally designated 15. The support takes the form of a vertically extending, slotted member 17. The member 17 has a horizontally extending arm 18 connected thereto to which a pair of spaced apart, parallel arms 18a and 18b are mounted. The arm 18a serves as the support for an arm 19. The arm 19 is pivotally connected at one end to the arm 18a by a pivot pin 20 with the other end of the arm supporting a generally horizontally extending, steadying roller 21 (see FIG. 2). A second steadying roller 21a is mounted on an arm 19a which is similarly pivoted to the other arm 18b, as shown in FIG. 1. A gauging head support rod 22, extends from a boss 16 formed on the arm 19 adjacent to the pivot pin 20. A gauging or inspection head is generally designated by point 9 and is rotatably mounted on rod 22.

The degree of rotation of arm 19 and pivot pin 20 about the pivotal axis of the pin 20 is controlled through the interaction of a tension spring 52 and an adjustable set screw 53. One end of tension spring 52 is fastened to an anchor pin 54, which in turn is fixed to the arm 18a. The other end of the spring 52 is in engagement with the outer end of a pin 55 which has its inner end mounted on the arm 19. As can readily be seen, the spring 52 holds the pin 55 against the set screw 53 which is also mounted on arm 18a by means of an angle bracket 56.

The support rod 22 carries an annular sleeve 29 which is clamped thereto by a set screw 24. As can be seen in FIG. 2, the rod 22 has a groove 25 extending along its length within which the end of the screw is adapted to seat to fix the position of the sleeve 29 relative to the rod 22. The sleeve 29 is formed with a rearwardly extending boss 23 which supports a pivot shaft 33. The ends of the shaft 33 extend beyond the sides of the boss 23 and serve as the pivot for a sensing tape carrying arm 32. The arm 32 is provided with downwardly extending portions which embrace the shaft 33. The annular sleeve 29 carries a second collar 29a which is clamped to the annular sleeve by a set screw 30. The collar 29a has a stop pin 31 fixed thereto with the pin extending generally parallel to the rod 22 in a direction such that it serves as a stop for the tape carrying arm 32. The arm 32 will have its forward end resting against the stop pin 31 when the arm is out of gauging position and no container is in contact with the tape. The arm 32 is normally biased in a counterclockwise direction by a tension spring 35. The spring 35 has one end connected to a pin 34 fixed to the boss 23 and its other end connected to a pin 34a fixed on the arm 32.

The upper surface of the arm 32 is grooved to receive a flexible, metal sensing tape 36. The sensing tape 36 is secured to the arm 32 by a clamping shoe 37. A set screw 38 passing through a bracket 39 coacts with the clamping shoe 37 to fasten the tape to the arm. The bracket 39 is fastened to the sensing tape carrying arm 32 by a pair of screws 40.

The forward end of the sensing tape 36 is held in alignment by an upper tape guide 41 and a lower tape guide 42. Both of these guides are mounted on the sensing tape carrying arm 32. Intermediate the tape guides 41 and 42, is a bracket 43 which is mounted on arm 32. The bracket 43 serves as a mount for an electro-mechanical transducer in the form of a commercially available phonograph cartridge 44, having the usual stylus or needle 45. This bracket 43 holds the stylus 45 in contact with that portion of the sensing tape 36 intermediate the guides 41 and 42.

As can be seen in FIG. 2 the bracket 43 is fixed to the arm 32 and a second bracket 46 supports the cartridge 44 in proper alignment, and is fastened to bracket 43 with screws 47.

The guides 41 and 42 retain the sensing tape 36 in linear alignment with the arm 32, with the sensing tip 26 of the tape 36 maintained against the rim surface 27 of container 10 when the container is raised into engagement therewith.

With the tape mounted as indicated above, when it is contacted by a defect in the sealing surface of the container, that portion of the tape between the guides 41 and 42 will buckle or vibrate. This buckling action provides an amplified mechanical response to the sensing of a defect and will be sensed by the stylus 45. The resulting electrical signal produced in the cartridge 44 is fed to an amplifier and delay circuit 49. The amplifier in turn is connected to a reject mechanism 50 which may be of conventional design. The reject mechanism is shown schematically in FIG. 2 and, as shown in FIG. 1, may take the form of a solenoid operated plunger 51. The plunger is reciprocated axially in response to a reject signal so that it will engage a container and hold it in the star wheel 12 so that upon index, the container will be moved to the reject position.

If the container is acceptable, the plunger is not operated thus when the container arrives at the position over the exit end of the conveyor 11, the container will be moved on the conveyor out of the pocket of the star wheel 12 and be moved to the packing line.

Obviously, the operation of the plunger must be delayed until the container which has been gauged as defective is moved to the exit position on the conveyor 11. Thus suitable delay means is provided so that the proper timing relationship is maintained.

It should be noted that the tape is oriented so that it lies in a plane which is at an angle of about 55–65° with respect to the horizontal plane of the container rim surface. Furthermore, that portion of the tape which extends below the guide 42 is not straight, but is in fact bent or flexed at an angle of about 40–50° with respect to the horizontal. This additional bending at the tip is a result of the forceful bearing of the tape against the container rim. This particular angle of contact is critical only in the sense that it will depend on the specific configuration of the container sealing surfaces.

Many of the containers do not have a perfectly rounded cross-sectional configuration in the upper sealing area. In these cases the tape edge is oriented to bear the sensing tip against a rounded edge of the finish adjacent to the sealing surface. FIG. 7 shows the angle of contact between the tape tip 26a and an irregular rim surface 27a.

As the name implies most line-over-finish defects actually extend up the side of the container neck and over the finish and these are the type of defects which result in an imperfect seal. When the cross sectional configuration of the rim sealing surface is other than rounded (e.g. flat), the tape has a tendency to skip over the line-over-finish defects that do not extend radially across the finish. This is because the tape and the defect are not in alignment across the flat rim surface. In these cases, the inspection is carried out at a rounded rim surface. This maximizes defect detection since there is no need for substantial alignment between the tape and the defect at this tangential contact point. This is shown in FIG. 8 where the tape tip 26b contacts the substantially flat rim surface 27b at a rounded edge.

FIGURES 3 to 6 illustrate rather schematically, the operational details of the present invention. As the container arrives at the inspection station it is received on spinner pad 14 and elevated so as to contact the sensing tape tip 26 with sufficient force to cause the tape to bend at a slight angle with the rim surface as shown in FIG. 3. The spinner pad is rotated to cause the container to rotate in the direction shown in FIGURES 3 through 6.

While the spinner pad is being raised, the container rim first contacts the steadying rollers before contacting the inspection tape tip. This stabilizes the container, and prevents impact between the container rim surface and the tip of the inspection tape. When the container is raised, contact is made with the steadying rollers 21 and 21a. As the container is raised further, the steadying rollers are also raised against the force exerted by the tension spring 52 until contact is made with the sensing tip 26. The actual vertical displacement of the container after contacting the steadying roller is only a fraction of an inch, before it contacts the sensing tip and illustrates the importance of minimizing the impact between the sensing tip and the container surface.

When the sensing tip and the container rim surface have made contact, the spinner pad continues to elevate until the sensing-tape-carrying arm is raised slightly above the stop pin 31. The tape tip is now held firmly in contact with the rim surface by means of the tension spring 35.

The angle at which the sensing tape tip contacts the rim surface is a compromise. As the angle approaches 90° the tape has a tendency to skip or bounce across the rim surface and fail to detect the defects. As the angle decreases from 90° the tendency to skip is lessened, but the tendency for the tape to slide over small depressions in the rim surface increases. The angle shown in the drawings is about 40–50°.

Sufficient force is placed on the sensing tip by means of the spring 35, to cause the tape to bend slightly as shown in FIG. 3. When the defect 60 passes under the sensing tip, the tip immediately straightens out and snaps down into the defect as shown in FIG. 4.

The tape is thin, flexible, mechanically durable, and elastic so it will be capable of fitting into small defects and will flex resiliently as the defect passes under the sensing head during rotation. This resilient flexing is shown in FIG. 5 wherein the continued movement of the defect to the left causes the tape to buckle. Buckling of the tape is sensed by the phonograph stylus. This buckling is thus converted to an electrical signal by the phonograph cartridge, as described above.

The sensing tape has a shock absorbing bend 52 which permits slight linear displacement when the tape is buckled in reaction to a rim surface defect as shown in FIGURE 5. The lower end of arm 32 is rounded to minimize damage to the tape as it is being flexed. This lower end of arm 32 also serves as a pivot or fulcrum point for the flexing tape. The lower guide 42 loosely retains the tape so there is sufficient clearance to let the tape slide freely under it, either during normal operation or when the tape is being buckled by a defect.

The upper tape guide 41 holds the tape in place at the shock absorbing bend as well as keeping the tape lightly contacted against the stylus while acceptable rim surfaces are being inspected. There is sufficient clearance under this upper guide to permit the tape to slide relatively free when being buckled by a defect.

FIGURE 6, while similar to FIGURE 3, illustrates the recovery position of the sensing tape after it has detected the defect. After extended periods of operation (i.e. once or twice per 8 hour shift), it may be necessary to trim the inspection edge of the tape to assure efficient operation.

Various modifications may be resorted to within the spirit and scope of the following claims.

I claim:
1. The method of inspecting glass containers for line-over-finish defects comprising, the steps of moving a first container into an inspection station, rotating the container in an upright position about its central vertical axis, contacting the squared edge of a thin strip of flexible, mechanically durable, tape with the rim surface portion of the container, mechanically biasing said edge against said rim surface supporting said tape so that said tape buckles when said edge engages a line-over-finish defect in said moving rim surface, transducing the buckling of said tape into an electrical signal, amplifying said electrical signal and segregating glass containers in response to the amplified electrical signal.

2. Apparatus for gauging the rim surface of containers for line-over-finish defects comprising, container indexing means for successively presenting containers to an inspection station, means at said station for elevating and rotating a container to be gauged, a stationary member positioned adjacent said station, a pair of parallel arms pivotally mounted on said member, a steadying roller mounted on the end of each of said arms, means connected between said arms and the member for biasing the arms in a downward direction whereby said rollers are held in engagement with the container to be gauged, a thin strip of flexible, resilient tape, a support for holding said tape with one end extending beyond the support, means pivotally mounting said support to one of said arms, means connected to said support for biasing said support in a downward direction whereby the edge of said tape contacts the rim surface of the container, means carried by said support for sensing the vibration of said tape.

3. The apparatus of claim 2, wherein said support comprises, a forwardly and downwardly sloping surface for supporting a length of tape and means for retaining the tape in close conformity to the configuration of said support, said retaining means loosely retaining the tape at a pair of points along the length of the tape, whereby when the tape edge engages a defect the tape buckles between the retaining means.

4. The apparatus of claim 3, wherein said means for indicating the vibration of said tape is an electro-mechanical transducer capable of converting the vibration into an electrical signal.

5. The apparatus of claim 4, wherein said transducer comprises, a phonograph cartridge having a sensing needle in contact with the portion of the tape that buckles.

6. The apparatus of claim 5, further including means for amplifying said electrical signal and means for segregating glass containers in response to the amplified electrical signal.

7. In the apparatus for contact gauging the rim surface of containers for line-over-finish defects wherein container indexing means is provided for successively presenting containers to an inspection station, with means at said said station for elevating and rotating the container to be gauged, means for stabilizing said container during rotation, and gauging means operable at said station for sensing line-over-finish defects, the improvements in said gauging means comprising:
  a station gauge support,
  an arm pivotally mounted on said support, a thin strip of flexible, resilient, tape, means on said arm for supporting a length of said tape with one end portion of said tape extending downwardly beyond the lower end of said arm and permitting said tape to buckle upon contact with a defect in the container rim, means connected to said arm for biasing said one end portion of said tape in a downward direction in contact with the rim surface of an elevated container at said inspection station,
  a vibration sensing device mounted on said arm with the vibration sensitive element thereof in contact with that portion of the tape that buckles whereby the buckling of said tape is converted to an electrical signal.

8. The apparatus of claim 7, wherein said arm is formed with a forwardly and downwardly sloping upper surface for supporting said length of tape and wherein said arm is formed with guide means positioned on said forwardly and downwardly sloping upper surface for retaining the tape in close conformity to the configuration of said upper surface.

9. The apparatus of claim 8, wherein said guide means loosely retain the tape at a pair of points along said downwardly sloping upper surface whereby when said one end of said tape engages a defect the tape buckles between said pair of points.

10. The apparatus of claim 7, wherein said stationary gauge support comprises a rod horizontally extending over the container rim surface, an annular sleeve formed with a rearwardly extending boss mounted on said rod, said boss carrying a shaft, said shaft pivotally carrying said arm.

References Cited

UNITED STATES PATENTS

| | | | |
|---|---|---|---|
| 3,071,247 | 1/1963 | Paruolo | 209—88 |
| 3,101,147 | 8/1963 | Fry | 73—104 X |

M. HENSON WOOD, JR., *Primary Examiner.*

RICHARD A. SCHACHER, *Assistant Examiner.*